United States Patent
Fowler et al.

(10) Patent No.: US 8,979,724 B2
(45) Date of Patent: Mar. 17, 2015

(54) GENERAL MEDICATION DISPOSAL SYSTEM

(71) Applicant: Teikoku Pharma USA, Inc., San Jose, CA (US)

(72) Inventors: William Fowler, Minneapolis, MN (US); Clayton Anderson, Burnsville, MN (US); Carter Anderson, Inver Grove Heights, MN (US)

(73) Assignee: Teikoku Pharma USA, Inc., San Jose, CA (US)

( * ) Notice: Subject to any disclaimer, the term of this patent is extended or adjusted under 35 U.S.C. 154(b) by 103 days.

(21) Appl. No.: 13/629,316

(22) Filed: Sep. 27, 2012

(65) Prior Publication Data
US 2013/0085313 A1    Apr. 4, 2013

Related U.S. Application Data

(60) Provisional application No. 61/542,026, filed on Sep. 30, 2011.

(51) Int. Cl.
*B09B 3/00* (2006.01)

(52) U.S. Cl.
CPC ........... *B09B 3/0075* (2013.01); *B09B 2220/14* (2013.01)
USPC .................................................. 588/249.5

(58) Field of Classification Search
USPC .............................................. 588/249.5, 252
See application file for complete search history.

(56) References Cited

U.S. PATENT DOCUMENTS

| | | | |
|---|---|---|---|
| 4,588,580 A | 5/1986 | Gale et al. | |
| 4,909,256 A | 3/1990 | Peck | |
| 5,019,254 A * | 5/1991 | Abrevaya et al. | 210/616 |
| 5,149,538 A | 9/1992 | Granger et al. | |
| 5,236,714 A | 8/1993 | Lee et al. | |
| 5,396,901 A | 3/1995 | Phillips | |
| 5,468,447 A * | 11/1995 | Bermas | 422/5 |
| 5,597,617 A | 1/1997 | DeLiso et al. | |
| 5,804,215 A | 9/1998 | Cubbage et al. | |
| 5,899,856 A | 5/1999 | Schoendorfer et al. | |
| 6,024,012 A * | 2/2000 | Luzenberg, Jr. | 99/323 |

(Continued)

FOREIGN PATENT DOCUMENTS

| | | |
|---|---|---|
| WO | WO 02/087482 A1 | 11/2002 |
| WO | WO 03/103673 A1 | 12/2003 |
| WO | WO2009019668 | 2/2009 |

OTHER PUBLICATIONS http://www.tetra-fish.com/Products/whisper-aquarium-power-filter-cartridges/whisper-ex-aquarium-carbon-filter-cartridges.aspx printed Sep. 3, 2014.*
https://web.archive.org/web/20090120011243/http://tetra-fish.com/sites/TetraFish/aquarium/AquariumContentTwoColumn.aspx?id=2416 printed Sep. 3, 2014.*
PCT Notification of Transmittal of the International Search Report and the Written Opinion of the International Searching Authority, or the Declaration, International Application No. PCT/US2012/057615, mailed on Feb. 27, 2013, 12 pages.

(Continued)

*Primary Examiner* — John Kreck
(74) *Attorney, Agent, or Firm* — Bret E. Field; Daniel G. Stoddard; Bozicevic, Field & Francis LLP

(57) ABSTRACT

General medication disposal systems are provided. Aspects of the systems include devices having a sealable container dimensioned to accommodate a pharmaceutical composition; and an amount of an inactivating substance, e.g., granulated or pelletized activated carbon, present inside of the sealable container. Aspects of the invention further include methods of making and using the systems, as well as kits comprising the devices of the system.

20 Claims, 3 Drawing Sheets

(56) References Cited

U.S. PATENT DOCUMENTS

| | | | |
|---|---|---|---|
| 6,261,595 | B1 | 7/2001 | Stanley et al. |
| 6,261,596 | B1 | 7/2001 | Li et al. |
| 6,279,736 | B1 | 8/2001 | Hekal |
| 6,660,901 | B2 | 12/2003 | Church |
| 7,431,863 | B2 * | 10/2008 | Pickens .............. 252/187.3 |
| 7,918,776 | B2 | 4/2011 | Day |
| 2002/0150606 | A1 | 10/2002 | Yamada |
| 2002/0187183 | A1 | 12/2002 | Becher et al. |
| 2003/0068392 | A1 | 4/2003 | Sackler |
| 2003/0078552 | A1 | 4/2003 | Tepper et al. |
| 2004/0013716 | A1 | 1/2004 | Gale et al. |
| 2004/0033255 | A1 | 2/2004 | Baker et al. |
| 2004/0109886 | A1 * | 6/2004 | Rigby .................. 424/449 |
| 2004/0146547 | A1 | 7/2004 | Marcenyac et al. |
| 2004/0241218 | A1 | 12/2004 | Tavares et al. |
| 2005/0035041 | A1 * | 2/2005 | Nohren et al. ............ 210/209 |
| 2005/0037059 | A1 | 2/2005 | Miller |
| 2006/0110080 | A1 | 5/2006 | Thomas et al. |
| 2007/0250339 | A1 | 10/2007 | Mallett et al. |
| 2009/0131732 | A1 | 5/2009 | Day |
| 2009/0180936 | A1 * | 7/2009 | Anderson et al. .......... 422/129 |
| 2010/0083963 | A1 | 4/2010 | Wharton et al. |

OTHER PUBLICATIONS

Greensher, et al., "Ascendency of the black bottle (activated charcoal)", Pediatrics, 1987, 80:949-51.

Kansas Department of Health and Environment, Disposal Options for Expired or Surplus Medications/Pharamceuticals, Technical Guidance Document SW 07-1.

Living on Earth.org online interview with the EPA, Oct. 3, 2008.

Marquardt, et al., "Fentanyl remaining in a transdermal system following three days of continuous use", Ann Pharmacother, 1995, 29:969-71.

Melissa C. Stoppler, Expired Medication Disposal: The "Green" way to dispose of old or unused medications, 2008.

Sassaman and Snyder, Air Force Print News Today, Prevent Placing Pharmaceuticals in Travis Water System, Mar. 24, 2008.

Yerasi, et al., "Disposal of used fentanyl patches", Am J Health Syst Pharm, 1997, 54:85-6.

Zambaux, et al., "Validation of a method to inactivate fentanyl in the used devices of Durogesic", Ann Pharm Fr, 2000, 58:176-9.

Zoraflex ACC, 100% Activated Woven Carbon Cloth, Calgon Carbon Corporation, 2008, 2pp.

* cited by examiner

GENERAL MEDICATION DISPOSAL SYSTEM

CROSS-REFERENCE TO RELATED APPLICATIONS

Pursuant to 35 U.S.C. §119 (e), this application claims priority to the filing date of U.S. Provisional Patent Application Ser. No. 61/542,026 filed on Sep. 30, 2011; the disclosure of which application is herein incorporated by reference.

INTRODUCTION

The temptation and potential for prescription drug abuse by ingestion, injection, etc., and particularly, of narcotics and other controlled substances is well known. This widespread abuse issue is exemplified by the current problems associated with morphine, oxycontin, fentanyl, and many others.

Unfortunately, problems associated with medications are not limited to abusable narcotics. According to a recent investigative report by the Associated Press, Americans flush 250 million pounds of pharmaceuticals down the drain every year (see e.g., Living on Earth.org online interview with the EPA, Oct. 3, 2008). Furthermore, this practice of pharmaceutical composition disposal has resulted in contamination of the drinking water supply of numerous major cities throughout the U.S. (see e.g., Air Force Print News Today, Mar. 24, 2008).

These contaminants pose risk to the environment; affecting people, fish and wildlife. Potential problems include abnormal physiological processes, reproductive impairment, increased evidence of cancer, and development of anti-microbial resistant organisms (reference: Kansas Dept of Health and Environment, Mar. 22, 2007). A significant source of pharmaceutical environmental contamination lies with disposal of unused or expired medications (reference eMedicineHealth Mar. 21, 2008). Historically, these medications are flushed down the toilet or thrown into the trash, with a likely outcome that they will eventually end up in groundwater supplies. The only medications that the FDA condones flushing down the toilet are controlled substances with abuse potential. Thus, many people are faced with a dilemma of how best to dispose of unused and expired medications.

Of particular interest is the potential for abuse or environmental release associated with medications contained in transdermal patch technology. Unfortunately, with transdermal patches significant amounts of drug compound remain in the patches after patients have worn them for the prescribed period of time. The need for this excess amount of drug is well known; it is required to ensure an adequate driving force in the transdermal application for the full wear time period. For example, in a published test of Duragesic® (trademark of Johnson & Johnson) patches worn for the full 72-hour wear period, 28-84.4% of the original loading of fentanyl still remained in the patches. The authors of the study concluded that the residual dosage represented amounts sufficient for abuse and misuse and was even potentially lethal (Marquardt et al, Ann Pharmacother, 1995, 29:969-71).

Environmental and abuse problems are certainly not limited to medications in transdermal patch form. In fact, medications are most often in oral pill or liquid solution form. Once unused or expired oral medications are discarded, these medications may be recovered from the trash and abused by others. In addition, compounds from large amounts of discarded medications are inevitably released to the ground water supply over time.

SUMMARY

Medication disposal systems are provided. Aspects of the systems include devices having a sealable container dimensioned to accommodate a pharmaceutical composition; and an amount of an inactivating substance, e.g., granulated or pelletized activated carbon, present inside of the of sealable container. Aspects of the invention further include methods of making and using the systems, as well as kits comprises the devices of the system.

DETAILED DESCRIPTION

Figure 1A:
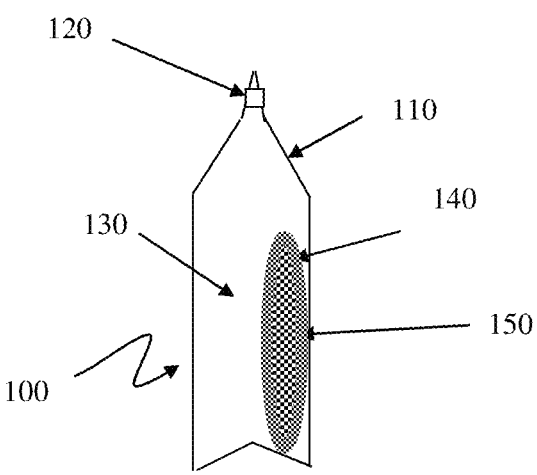
FIG. 1A provides a view of an embodiment pharmaceutical composition disposal device having an inner pouch that contains a water permeable/carbon impermeable separator barrier.

Medication disposal systems are provided. Aspects of the systems include devices having a sealable container dimensioned to accommodate a pharmaceutical composition; and an amount of an inactivating substance, e.g., granulated or pelletized activated carbon, present inside of the of sealable container. Aspects of the invention further include methods of making and using the systems, as well as kits comprises the devices of the system.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

In further describing various embodiments of the invention, aspects of the devices are reviewed first in greater detail, followed by a detailed description of embodiments of using the devices and a review of kits that include the devices.

Devices

As summarized above, devices for use in disposal of pharmaceutical compositions are provided. Aspects of the devices include a sealable container and an amount of an inactivating agent present in the container. The sealable container may have any convenient configuration. In some instances, the sealable container is dimensioned to accommodate a pharmaceutical composition that is to be inactivated. Configurations of interest for the container include, but are not limited to, bottles, bags, pouches, etc., where the walls of the container may be rigid or flexible, as desired. In those embodiments where the containers are dimensioned to accommodate a pharmaceutical composition, the interior volume of the container will be such that the pharmaceutical composition can be positioned inside of the container, where in some instances when the pharmaceutical composition is placed inside of there is also additional space to accommodate a volume of liquid, e.g., from ¼ cup to 2 cups of liquid or more. Accordingly, the volume of the container may range in some instances from 50 to 500 ml, such as 100 to 400 ml, including 200 to 375 ml. Where the container has a pouch or bag configuration, the dimensions of such may vary, ranging in some instances from 2×3 inches to 8×10 inches. While the thickness of the walls of the container may vary, in some instances the walls have a thickness ranging from 0.1 to 2.0 mm, such as 0.1 to 1.0 mm. The container may be fabricated from any convenient material that is impermeable to liquid, e.g., an aqueous liquid, where materials of interest include polymeric materials (e.g., polyvinylchloride, polyethylene, polyvinylacetate, etc.,) which materials may be transparent, translucent or opaque, as desired.

As summarized above, the container is sealable. Accordingly, the container includes a sealable closure device (e.g., a resealable closure device), which when opened provides access to deposit the pharmaceutical composition into the container. The sealable closure device for closing the container or pouch also provides a closed system for disposing of the used medication. The closure system may include an adhesive seal or plastic container reseal device such as those associated with the trademark ZIPLOC® to seal the pharmaceutical composition in the container.

Present inside of the container is an amount of an inactivating substance. Inactivating substances of interest are those substances which, upon contact with the active agent of the pharmaceutical composition, at least partially inactivate the active agent, i.e., at least diminish if not destroy the activity of the active agent. Inactivating substances of interest include, but are not limited to binding agents, where the term "binding agent" means a substance or combination of substances that immobilize or otherwise deactivate an active agent on contact. Binding agents of interest include adsorption substances that adsorb the active agent or chemisorb substances that chemically bind the active agent. Substances of interest are ones which begin to perform the immobilization or other deactivation immediately on contact with the active agent of the pharmaceutical composition.

Binding agents of interest include agents that immobilize the medication and preclude future separation by normally available means. Specific examples of such agents include, without limitation, zeolites, clays, silica gel, aluminum oxide and activated carbon. Activated carbon is suitable for the adsorption or chemisorption of active agents, including synthetic opioids such as fentanyl. The term "activated carbon" is used in its conventional sense to refer to a form of carbon that has been processed to provide for a surface area in excess of 500 $m^2$. When present as the binding agent, the activated carbon may be in powder, granular or pelletized form. Powdered activated carbon is a particular carbon composition having an average particle size of 0.25 mm or less, e.g., from 0.15 to 0.25 mm, while granular or pelletized activated carbon is made up of particles or pellets having an average size of 0.25 mm or higher, such as from 0.25 to 5.0 mm. In some instances in which the activated carbon is present in powder form (as well as other forms), the activated carbon will not be free-flowing in the container, i.e., the activated carbon will be stably associated with another component of the container, e.g., a wall of the container, a solid support in the container, or a pouch inside of the container, such as described in greater detail below. In yet other instances where the activated carbon is present in granular or pelletized form, the granular or pelletized form of the activated carbon may be free-flowing in the container.

In addition or alternatively to binding agents, the inactivating substance may include other substances which in some way render the active agent of the pharmaceutical composition unusable. Accordingly, the inactivating substance may contain one or more of an antagonist, an oxidizing compound, an irritant compound or an anti-abuse distressing agent. Such compounds may be used singly or in combination and instead of the binding agent or in addition to the binding agent in the inactivating substance. When used in combination with the binding agent, such compounds may be pre-adsorbed on a portion of the binding agent, as desired. Antagonists of interest are those which exhibit antagonist activity relative to the active agent of the pharmaceutical composition, e.g., naloxone or naltrexone for opioids. Examples of such oxidizing agents include perborates, percarbonates, peroxides, and hypochlorites. Examples of irritant compounds include capsaicin or ipecac. Examples of anti-abuse distressing agents include bitter taste agents, such as dehydrocholic acid.

The amount of the inactivating substance in the container may vary, and may be selected to be more than theoretically required to substantially inactivate the amount of active agent in the pharmaceutical composition for which the device has been configured. While the exact amount may vary, in some instances the weight ratio of inactivating substance (e.g., activated carbon) to active agent is 2 (i.e., 2/1) or higher, such as 3 or higher, including 4 or higher, such as 5 or higher.

As indicated above, in some instances the inactivating substance is not free-flowing inside of the container. In other words, the inactivating substance is stably associated with some other component of the container, e.g., an inside wall of the container, a support present in the container, a liquid permeable pouch inside of the container, etc. By "stably associated" is meant that the inactivating substance is immobilized relative to the other component at least prior to use of the container, e.g., prior to inclusion of liquid in the container. As such, in some instances the inactivating substance may be adhered to an inner surface of the container, e.g., as a layer on the inner surface of the container. Where desired, a liquid permeable cover (i.e., liner) may be positioned over the layer. In other embodiments, a support (e.g., a flexible or rigid, permeable or impermeable, solid structure) may be provided inside of the container and unattached to the container, where the inactivating substance is stably associated with one or more surfaces of the support.

In some instances, inactivating substance may be present in a liquid, e.g., water, permeable enclosure (such as a pouch), which enclosure allows for liquid to pass into the inside of the enclosure but holds the contents of the enclosure inside of the enclosure, at least prior to contact with liquid. In some instances, the enclosure is fabricated from a water permeable material which maintains the inactivating substance inside of the enclosure after the enclosure has been contacted with liquid. Any convenient material may be employed for the inner enclosure, including materials commonly employed for tea bags, e.g., cellulose materials, etc. In some instances, the material is one that dissolves in liquid, e.g., water, i.e., the material is water-soluble. In such embodiments, pouch materials of interest include polymeric materials, e.g., which are formed into a film or sheet. The pouch material can, for example, be obtained by casting, blow-molding, extrusion or blown extrusion of the polymeric material, for example. Polymers, copolymers or derivatives thereof suitable for use as pouch material include, but are not limited to: polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum; polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, polyvinyl alcohols, polyvinyl alcohol copolymers and hydroxypropyl methyl cellulose (HPMC), and combinations thereof. The polymer can have any weight average molecular weight, such as from 1000 to 1,000,000, e.g., from 10,000 to 300,000, including from 20,000 to 150,000. Mixtures of polymers can also be used as the pouch material. This can be beneficial to control the mechanical and/or dissolution properties of the compartments or pouch, depending on the application thereof and the required needs. Suitable mixtures include for example mixtures wherein one polymer has a higher water-solubility than another polymer, and/or one polymer has a higher mechanical strength than another polymer. Also suitable are mixtures of polymers having different weight average molecular weights, for example a mixture of PVA or a copolymer thereof of a weight average molecular weight of 10,000-40,000, such as around 20,000, and of PVA or copolymer thereof, with a weight average molecular weight of 100,000 to 300,000, such as 150,000. Also suitable herein are polymer blend compositions, for example comprising hydrolytically degradable and water-soluble polymer blends such as polylactide and polyvinyl alcohol, obtained by mixing polylactide and polyvinyl alcohol, e.g., comprising about 1-35% by weight polylactide and about 65% to 99% by weight polyvinyl alcohol. The inner enclosure may or may not be joined to the container.

In some instances, the container further includes one or more excipients which impart additional functionality to the container. For example, buffering agents may be included in the container to provide for pH adjustment to a pH which provides for optimal inactivation, e.g., via adsorption, of the active agent. Any convenient buffering agent that provides for the desired pH during use may be employed. Another type of excipient of interest is salt, such as a divalent metal cation salt, e.g., where the divalent metal cation is selected from the group consisting of $Ca^{2+}$ and $Mg^{2+}$. Such salts may be employed in amount sufficient to prevent the "swelling" (water absorption) of hydrogel patches when the patch is the pharmaceutical composition. An example ion is the use of calcium or magnesium salts that can be used to minimize the water absorption and expansion of Lidoderm hydrogel patches. Yet another excipient of interest is a suspending agent. For example, the container may include an amount of gelling agent which enables suspension of the activated carbon and medication together in a viscous slurry to achieve intimate contact between the activated carbon and dissolved medication throughout the slurry. One gelling agent that of interest is HPMC (Hydroxypropylmethylcellulose), at a concentration by weight of from 0.5 to 5.0% (w/w) when mixed with an amount of water. The process using a gelling agent has an additional advantage because the viscous gel helps retain the mixture, including medications in dissolved form, within the container, e.g., it will not leak out readily as would a non-viscous solution should there be a breach in the container. The above excipients may be used singly or in combination, and may be provided in the container separate from the inactivating substance or combined with the inactivating substance.

Where desired, the container may include a vent. The vent may have any configuration that allows for passage of gas generated during use of the device from the inside to the outside of the container. Vents of interest include one way gaseous vents which allow for passage of gas from inside the container to outside of the container but not vice versa, such as vents typically found in coffee bags, e.g., as described in U.S. Pat. No. 4,000,846.

Figure 1B:
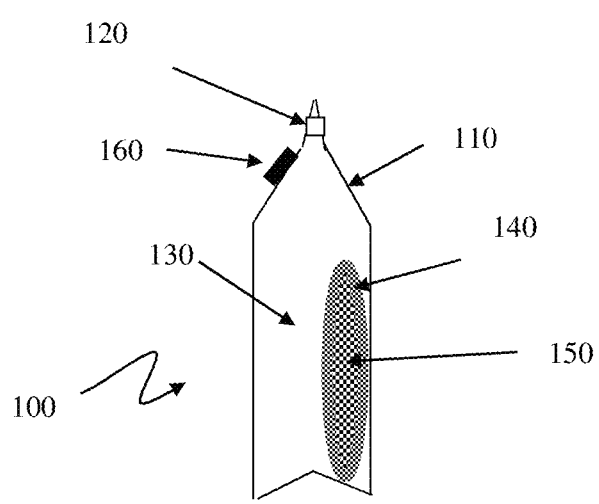
FIG. 1B shows a variation of the device shown in FIG. 1A that includes a vent.

Turning now to the Figures, FIG. 1A provides a view of a pharmaceutical composition disposal device 100 according to one embodiment of the invention. The device 100 includes a container in the form of a re-sealable pouch 110 having a ZIPLOC® type seal 120 at the top. Inside of the container 110 is an inner pouch 130 which contains a water permeable/granular activated carbon impermeable barrier 140 containing an amount of granular activated carbon 150. Shown in FIG. 1B is variation of the device shown in FIG. 1A, which includes a one-way gas vent 160 located proximal to the seal 120.

The devices of the invention may be fabricated according to any convenient protocol. Such methods generally include placing an amount of inactivating substance, e.g., granulated or pelletized activated carbon, into a re-sealable container, e.g., as described above. Fabrication may further include placement of other components, e.g., excipients, into the container, e.g., as described above.

Methods of Use

Aspects of the invention further include methods of disposing a pharmaceutical composition by using devices such as described above. In practicing methods of the invention, the pharmaceutical composition to be disposed of is placed inside of the container. A variety of different types of pharmaceutical compositions may be disposed of via embodiments of the invention, where the pharmaceutical compositions may be liquids or solids, where solid pharmaceutical compositions may be pills (i.e., tablets), capsules, topical compositions, such as patches or tapes, among other forms.

Where the pharmaceutical composition is a liquid, the liquid pharmaceutical composition may simply be placed in the container and the container sealed, with no additional liquid introduced into the container. Where the pharmaceutical composition is a solid, a volume of liquid, e.g., an aqueous medium, such as pure water, may be employed, e.g., to enhance contact of the active agent from the pharmaceutical composition and the inactivating substance. In certain embodiments, the amount of liquid is less than the amount necessary to completely dissolve the pharmaceutical composition. For example, if a drug is soluble at 1 gram per liter, adding less than 1 liter will be ultimately more effective for adsorption of the 1 gram of drug. Thus, certain embodiments include addition of water less than the solubility volume for the medication to be deactivated. When employed, the volume of liquid may vary, ranging in some instances from ¼ cup to 2 cups. The protocol in such instances may vary, with the liquid being introduced into the container prior to the pharmaceutical composition, or the pharmaceutical composition being introduced into the container prior to the liquid. After the pharmaceutical composition and liquid have been introduced into the container, the container is sealed.

Where desired, the contents of the sealed container may be mixed, e.g., by agitating the container, manipulating the container if the container is flexible, etc. However, in some instances, the method does not comprise any mixing of the contents of the container following sealing of the container. For example, where the pharmaceutical composition is a topical composition such as a patch or tape, methods may include simply introducing the composition into the container with an amount of liquid and sealing the container, without subsequent mixing. When the pharmaceutical composition is patch, the patch may be covered with a water permeable layer, e.g., tissue paper, prior to placement into the container, e.g., provide for ease of handling. Where desired, the patch may be folded, e.g., in half, prior to placement in the container.

After the pharmaceutical composition (and optionally liquid) is placed inside of the container and the container is resealed, the container may be maintained for a storage period prior to ultimate disposal of the container, e.g., in a municipal sanitation system. When employed, the container may be stored for a period ranging from 1 day to 2 weeks, e.g., 1 to 7 days. During storage, the container may be maintained at any convenient temperature, e.g., room temperature.

Figure 2:
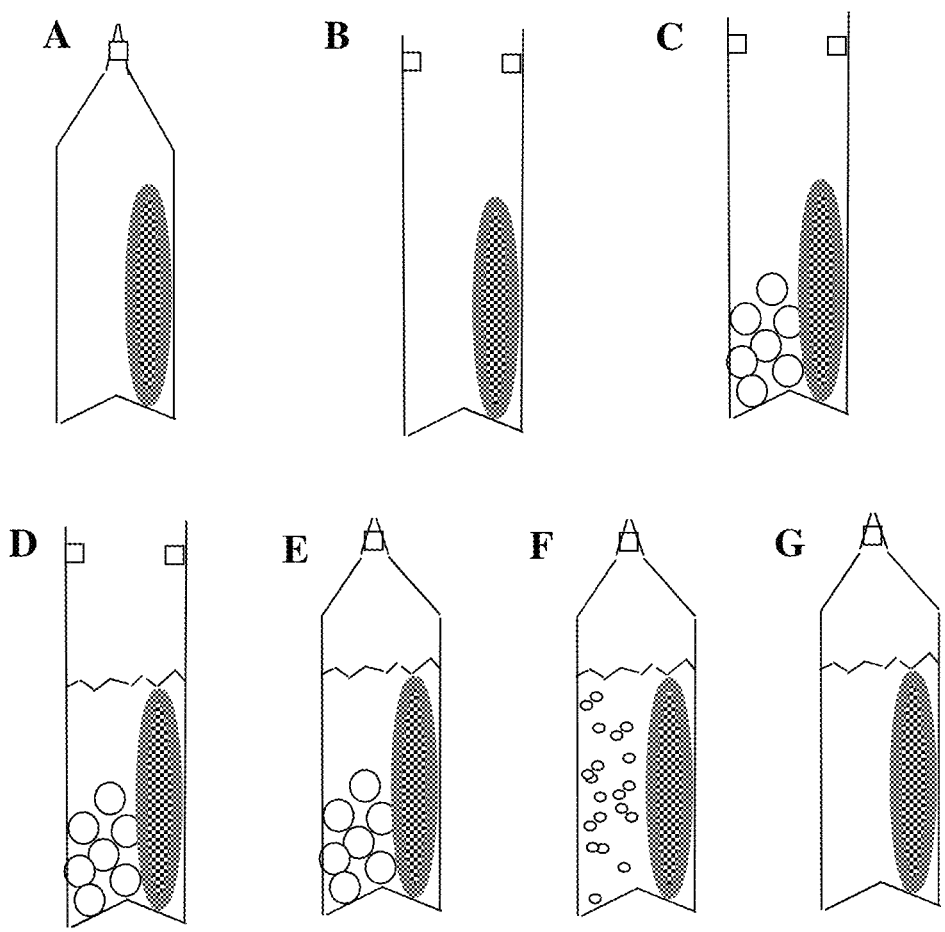
FIGS. 2A to 2G depict the sequence of how the device depicted in FIG. 1A may be used to dispose of a pharmaceutical composition.

FIGS. 2A to 2G provide sequential images of a method of disposing a pharmaceutical composition using a device of the invention as depicted in FIG. 1A. In FIG. 2A, a sealed device containing an inner pouch which in turn includes an amount of granular carbon is shown. During use, the container is opened (see FIG. 2B) and a number of pills are placed inside of the container (FIG. 2C). Next, a volume of water sufficient to cover the pills and the pouch is placed inside of the container (FIG. 2D) and the container is resealed (FIG. 2E). FIG. 2F illustrates dissolution of the pills and active agent contained therein in the water. FIG. 2G illustrates adsorption of the active agent into the granular activated carbon present inside of the inner pouch.

Utility

The devices of the invention find use in disposal of a variety of different types of pharmaceutical compositions, e.g., where the pharmaceutical compositions may be liquids or solids, where solid pharmaceutical compositions may be pills (i.e., tablets), capsules, topical compositions, such as patches or tapes, among other forms. Methods and devices of the invention find use is disposing any type of active agent, including those that may be subject to abuse, e.g., opioids and other painkillers, hormones, etc., in a manner that prevents abuse and is environmentally sound (e.g., in that it prevents the active agent from entering the ecosystem).

Kits

Kits for use in practicing certain methods described herein are also provided. In certain embodiments, the kits include one or more devices as described above. In certain embodiments, the kits include additional components that find use in the methods, e.g., an amount of liquid for introducing into the container, tissue paper, etc., as described above. In a given kit that includes two or more compositions, the compositions may be individually packaged or present within a common container.

In certain embodiments, the kits will further include instructions for practicing the subject methods or means for obtaining the same (e.g., a website URL directing the user to a webpage which provides the instructions), where these instructions may be printed on a substrate, where substrate may be one or more of: a package insert, the packaging, reagent containers and the like. In the subject kits, the one or more components are present in the same or different containers, as may be convenient or desirable.

Additional Embodiments

1. A device for use in disposing an amount of a pharmaceutical composition, the device comprising:
    a sealable container dimensioned to accommodate the pharmaceutical composition; and
    an amount of granulated or pelletized activated carbon present inside of the of sealable container.
2. The device according to Clause 1, wherein the sealable container is a re-sealable container.
3. The device according to Clause 1 or 2, wherein the container is configured as a pouch.
4. The device according to Clause 1, 2 or 3, wherein the granulated or pelletized activated carbon comprises activated carbon particles ranging in size from 0.25 to 5.0 mm.
5. The device according to any of the preceding clauses, wherein the amount of granulated or pelletized activated carbon is contained in a liquid permeable enclosure inside of the sealable container.
6. The device according to Clause 5, wherein the liquid permeable enclosure is a water permeable enclosure.
7. The device according to Clause 5, wherein the device further comprises an anti-abuse distressing agent.
8. The device according to Clause 7, wherein the anti-abuse distressing agent is combined with the granular activated carbon.

9. The device according to Clause 7, wherein the anti-abuse distressing agent is a bitter-tasting agent.
10. The device according to any of the preceding clauses, wherein the amount of granulated activated carbon is selected to be more than theoretically required to substantially inactivate the amount of pharmaceutical composition for which the device has been configured.
11. The device according to any of the preceding clauses, wherein the container further comprises an excipient.
12. The device according to Clause 11, wherein the excipient is a buffering agent.
13. The device according to Clause 11, wherein the excipient comprises a salt.
14. The device according to Clause 13, wherein the salt is a salt of a divalent metal cation.
15. The device according to Clause 14, wherein the divalent metal cation is selected from the group consisting of $Ca^{2+}$ and $Mg^{2+}$.
16. The device according to any of the preceding clauses, wherein the container comprises a vent.
17. The device according to any of the preceding clauses, wherein the container further comprises an amount of a liquid.
18. The device according to Clause 17, wherein the liquid is an aqueous liquid.
19. The device according to any of the preceding clauses, wherein the device comprises a suspending agent.
20. A method of disposing an amount of a pharmaceutical composition, the method comprising:
placing the amount of the pharmaceutical composition into a sealable container comprising an amount of granulated or pelletized activated carbon present inside of the of sealable container; and
sealing the sealable container.
21. The method according to Clause 20, wherein the sealable container comprises an amount of a liquid.
22. The method according to Clause 21, wherein the liquid is an aqueous liquid.
23. The method according to Clause 21, wherein the method comprises introducing the amount of liquid into the sealable container.
24. The method according to Clause 21, wherein the amount of liquid is less than the amount necessary to completely dissolve the pharmaceutical composition.
25. The method according to any of the preceding clauses, wherein the method does not comprise any mixing of the contents of the container following sealing of the container.
26. The method according to any of the preceding clauses, wherein the pharmaceutical composition is a liquid.
27. The method according to any of the preceding clauses, wherein the pharmaceutical composition is a solid.
28. The method according to Clause 27, wherein the pharmaceutical composition is a tablet.
29. The method according to Clause 27, wherein the pharmaceutical composition is a capsule.
30. The method according to Clause 27, wherein the pharmaceutical composition is a patch.
31. The method according to Clause 30, wherein the method comprises folding the patch prior to placement of the patch in the sealable container.
32. The method according to Clause 30, wherein the method comprises positioning tissue paper in contact with an adhesive layer of the patch prior to placement of the patch in the sealable container.
33. The method according to any of the preceding clauses, wherein the method comprises maintaining the sealed container for an incubation period prior to disposing the container.
34. The method according to Clause 33, wherein the incubation period ranges from 1 to 7 days.
35. The method according to Clause 33, wherein the method comprises disposing the container in a municipal sanitation system.
36. A kit comprising:
a sealable container; and
an amount of granulated or pelletized activated carbon.
37. The kit according to Clause 36, wherein the amount of granulated or pelletized activated carbon is present inside of the sealable container.
38. The kit according to Clause 36 or 37, wherein the amount or granulated pelletized activated carbon is contained in a liquid permeable enclosure inside of the sealable container.
39. The kit according to Clause 36, 37 or 38, wherein the kit further comprises an amount of liquid.
40. The kit according to any of the preceding clauses, wherein the kit further comprises tissue paper.
41. A method comprising placing an amount of granulated or pelletized activated carbon into a re-sealable container.
42. The method according to Clause 41, wherein the amount granulated or pelletized activated carbon is contained in a liquid permeable enclosure.
43. The method according to Clause 41 or 42, wherein the method further comprises placing an amount of an anti-abuse distressing agent into the re-sealable container.
44. The method according to Clause 41, 42 or 43, wherein the method further comprises placing an amount of an excipient into the re-sealable container.
45. The method according to Clause 44, wherein the excipient is selected from the group consisting of buffering agents, salts of divalent cations and combinations thereof.
46. A device for use in disposing an amount of a pharmaceutical composition, the device comprising:
a sealable container dimensioned to accommodate the pharmaceutical composition; and
an amount of an inactivating substance present inside of the sealable container, wherein the inactivating substance is not present in a free-flowing form.
47. The device according to Clause 46, wherein the inactivating substance is activated carbon.
48. The device according to Clause 47, wherein the activated carbon is present in powdered, granulated or pelletized form.
49. The device according to any of the preceding clauses, wherein the amount of inactivating substance is present in a liquid permeable pouch or the amount of inactivating substance is adhered to at least a portion of the inner surface of the container or the amount of inactivating substance is secured to a portion of the inner surface of the container by a liquid permeable liner or the amount of inactivating substance is adhered to a surface of a solid support.
50. The device according to any of the preceding clauses, wherein the device further comprises an anti-abuse distressing agent.
51. The device according to Clause 50, wherein the anti-abuse distressing agent is combined with the granular activated carbon.
52. The device according to Clause 50, wherein the anti-abuse distressing agent is a bitter-tasting agent.

The following examples are offered by way of illustration and not by way of limitation. Specifically, the following examples are of specific embodiments for carrying out the present invention. The examples are for illustrative purposes only, and are not intended to limit the scope of the present invention in any way.

EXAMPLES

I. Test of the General Medication Deactivation System, Using A) Granular Activated Carbon in Direct Contact with the Solution, and B) Granular Activated Carbon Self Contained in a Water Permeable Inner Pouch
A. Procedure:

Using 4 mg Dexamethasone pills as a model drug, 30 pills are placed into each of five pouches containing: 1) no absorbent (Control); 2) 45 grams of Generic Cat Litter; 3) 45 grams of Used Coffee Grounds; 4) MedsAway™ Design "A": 45 grams of freely accessible granular activated carbon (analogous to the device shown in FIG. 1A without the inner pouch but with free granular activated carbon); and 5) MedsAway™ Design "B": 45 Grams of Granular Activated Carbon contained in an inner water permeable/carbon impermeable pouch (analogous to FIG. 1A). 1 cup of tap water is added to each pouch followed by a 7-day incubation period. The drug contained in the water solution is analyzed. In a final wash-out test, the contents of each pouch is diluted in 1 gallon tap water, mixed periodically for 1 day, and the water-released dexamethasone is analyzed by HPLC.

Figure 3:
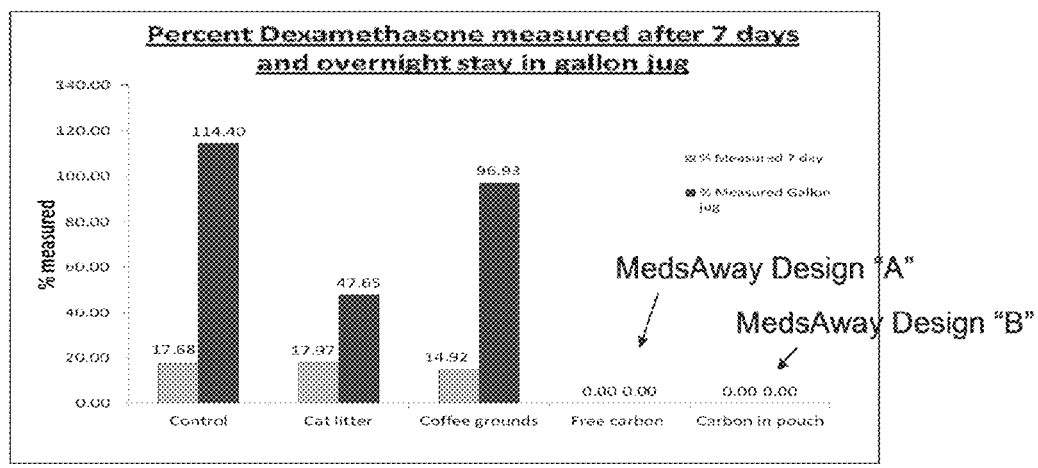
FIG. 3 provides experimental results with comparisons of deactivation between Untreated Control, Cat Litter, Coffee Grounds, Granular Activated Carbon (Design A, Free Carbon), and Granular Activated Carbon contained in an Inner Pouch (Design B, Carbon in Pouch).

B. Results:

The results of the experiment are presented graphically in FIG. 3. No measureable dexamethasone was released into either MedsAway Design "A" or MedsAway Design "B". A significant amount of dexamethasone was released in all other conditions.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is

1. A device for use in disposing an amount of a pharmaceutical composition, the device comprising:

a re-sealable container configured as a pouch and dimensioned to accommodate the pharmaceutical composition; and an amount of granulated or pelletized activated carbon present inside of the re-sealable container and contained in a liquid permeable enclosure fabricated from a liquid permeable material and present inside of the re-sealable container.

2. The device according to claim 1, wherein the granulated or pelletized activated carbon comprises activated carbon particles ranging in size from 0.25 to 5.0 mm.

3. The device according to claim 1, wherein the liquid permeable enclosure is a water permeable enclosure.

4. The device according to claim 1, wherein the device further comprises an anti-abuse distressing agent.

5. The device according to claim 4, wherein the anti-abuse distressing agent is combined with the granular activated carbon.

6. The device according to claim 4, wherein the anti-abuse distressing agent is a bitter-tasting agent.

7. The device according to claim 1, wherein the amount of granulated activated carbon is selected to be more than theoretically required to substantially inactivate the amount of pharmaceutical composition for which the device has been configured.

8. The device according to claim 1, wherein the container further comprises an excipient.

9. The device according to claim 8, wherein the excipient comprises a salt.

10. The device according to claim 9, wherein the salt is a salt of a divalent metal cation.

11. The device according to claim 10, wherein the divalent metal cation is selected from the group consisting of $Ca^{2+}$ and $Mg^{2+}$.

12. The device according to claim 1, wherein the container comprises a vent.

13. The device according to claim 12, wherein the vent is a one-way gas vent.

14. The device according to claim 1, wherein the container further comprises an amount of a liquid.

15. The device according to claim 14, wherein the liquid is an aqueous liquid.

16. The device according to claim 1, wherein the device comprises a suspending agent.

17. The device according to claim 1, wherein the liquid permeable enclosure is joined to the container.

18. A method of disposing an amount of a pharmaceutical composition, the method comprising:

placing the amount of the pharmaceutical composition into a sealable container comprising an amount of granulated or pelletized activated carbon present inside of the of sealable container and contained in a liquid permeable enclosure fabricated from a liquid permeable material and present inside of the sealable container; and sealing the sealable container.

19. The method according to claim 18, wherein the liquid permeable enclosure is joined to the container.

20. A device for use in disposing an amount of a pharmaceutical composition, the device comprising:

a sealable container configured as a pouch and dimensioned to accommodate the pharmaceutical composition; and an amount of an inactivating substance present inside of the sealable container, wherein the inactivating substance is not present in a free-flowing form and is adhered to an inner surface of the container as a layer on the inner surface of the container.

* * * * *